United States Patent
Naineni et al.

(10) Patent No.: US 10,642,785 B2
(45) Date of Patent: May 5, 2020

(54) OPTIMIZED NETWORK FILE SYSTEM CLIENT FOR READ-ONLY EXPORTS/MOUNTS

(71) Applicant: International Business Machines Corporation, Armonk, NY (US)

(72) Inventors: Malahal Naineni, Bengaluru (IN); Sachin C. Punadikar, Pune (IN); Madhu Thorat, Pune (IN)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 15/962,652

(22) Filed: Apr. 25, 2018

(65) Prior Publication Data
US 2019/0332684 A1    Oct. 31, 2019

(51) Int. Cl.
*G06F 11/07* (2006.01)
*G06F 16/182* (2019.01)
(Continued)

(52) U.S. Cl.
CPC ........ *G06F 16/122* (2019.01); *G06F 11/0772* (2013.01); *G06F 11/1479* (2013.01);
(Continued)

(58) Field of Classification Search
CPC ............ G06F 11/0772; G06F 11/1479; G06F 16/122; G06F 16/183; H04L 67/06; H04L 67/1097
See application file for complete search history.

(56) References Cited

U.S. PATENT DOCUMENTS 8,171,067 B2   5/2012  Brown et al.
8,229,899 B2*  7/2012  Anderson ............... G06F 16/10
                                                 707/690
(Continued)

OTHER PUBLICATIONS

"Network File System", Wikipedia, https://en.wikipedia.org/wiki/Network_File_System, retrieved from the internet Jan. 30, 2018, 6 pages.

*Primary Examiner* — Scott A. Waldron
(74) *Attorney, Agent, or Firm* — Stephen R. Tkacs; Stephen J. Walder, Jr.; Robert Sullivan

(57) ABSTRACT

A mechanism is provided in a data processing system comprising at least one processor and a memory comprising instructions which, when executed by the at least one processor, causes the at least one processor to implement a network protocol based file system client for read-only exports. The file system client receives a mount request to mount an export at a file system server. The file system client stores an access type of the mounted export. Responsive to the file system client receiving from a user a modification request to perform a modification on an object in the mounted export, the file system client sends an attribute check request to the file system server. Responsive to the file system client receiving a first read-only file system error from the file system server, the file system client sets a read-only file system error flag. Responsive to the file system client receiving a subsequent modification request to perform a modification on an object in the mounted export, the file system client determines whether the read-only file system error flag is set. Responsive to the file system client determining that the read-only file system error flag is set and the access type of the export is read-only, the file system client returns a second read-only file system error to the user.

21 Claims, 3 Drawing Sheets

(51) Int. Cl.
   *H04L 29/08* (2006.01)
   *G06F 16/11* (2019.01)
   *G06F 11/14* (2006.01)
   *G06F 16/17* (2019.01)

(52) U.S. Cl.
   CPC ........ *G06F 16/1734* (2019.01); *G06F 16/183* (2019.01); *H04L 67/06* (2013.01); *H04L 67/1097* (2013.01)

(56) References Cited

U.S. PATENT DOCUMENTS

| | | | |
|---|---|---|---|
| 8,260,811 B2 * | 9/2012 | Urano | G06F 21/6218 707/610 |
| 2003/0177107 A1 * | 9/2003 | Brown | G06F 16/11 707/999.001 |
| 2005/0273858 A1 * | 12/2005 | Zadok | G06F 21/50 726/24 |
| 2014/0222879 A1 | 8/2014 | Ricker et al. | |

\* cited by examiner

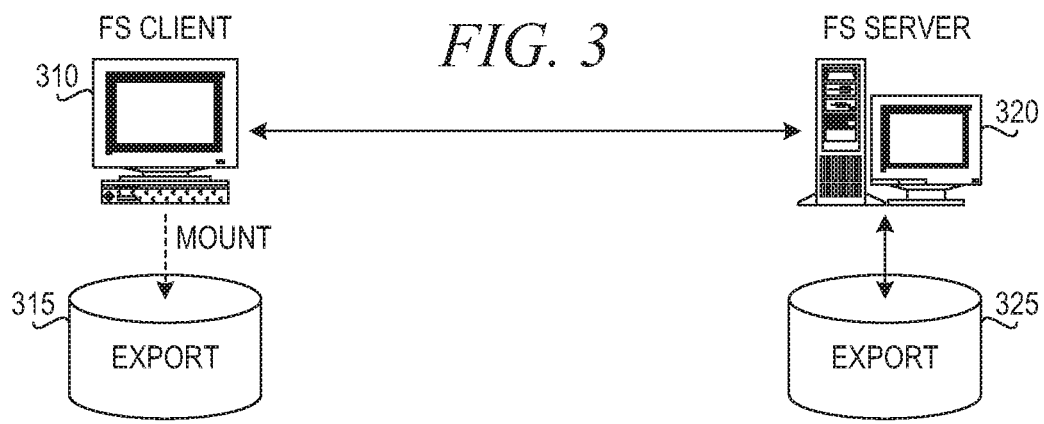
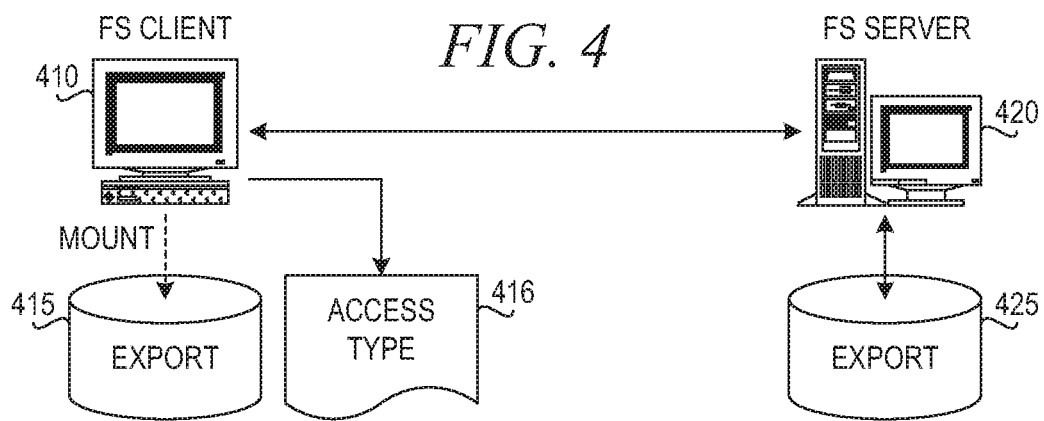
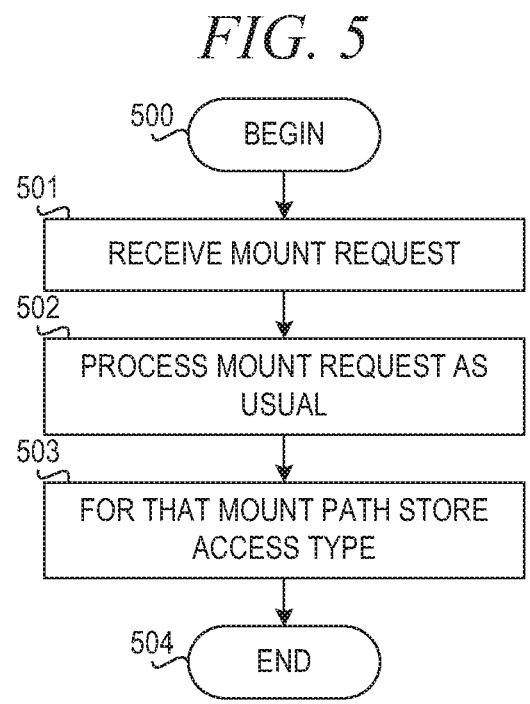

OPTIMIZED NETWORK FILE SYSTEM CLIENT FOR READ-ONLY EXPORTS/MOUNTS

BACKGROUND

The present application relates generally to an improved data processing apparatus and method and more specifically to mechanisms for optimizing network file system clients for read-only exports or mounts to reduce network utilization and to increase performance.

Distributed file systems are file systems that do not share block level access to the same storage but instead use a network protocol. These are commonly known as network file systems, even though they are not the only file systems that use the network to send data. Distributed file systems can restrict access to the file system depending on access lists or capabilities on both the servers and the clients, depending on how the protocol is designed.

Network File System (NFS) is one example of a distributed file system protocol allowing a user on a client computer to access files over a computer network much like local storage is accessed. NFS, like many other protocols, builds on the Open Network Computing Remote Procedure Call (ONC RPC) system. NFS is an open standard defined in Request for Comments (RFC), allowing anyone to implement the protocol.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and a memory comprising instructions which, when executed by the at least one processor, causes the at least one processor to implement a network protocol based file system client for read-only exports. The method comprises receiving, by the file system client, a mount request to mount an export at a file system server. The method further comprises storing, by the file system client, an access type of the mounted export. Responsive to the file system client receiving from a user a modification request to perform a modification on an object in the mounted export, the file system client sends an attribute check request to the file system server. Responsive to the file system client receiving a first read-only file system error from the file system server, the file system client sets a read-only file system error flag. Responsive to the file system client receiving a subsequent modification request to perform a modification on an object in the mounted export, the file system client determines whether the read-only file system error flag is set. Responsive to the file system client determining that the read-only file system error flag is set and the access type of the export is read-only, the file system client returns a second read-only file system error to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram of a network file system configuration in accordance with an illustrative embodiment;

FIG. 4 is a block diagram of an optimized network file system configuration for read-only exports/mounts in accordance with an illustrative embodiment;

FIG. 5 is a flowchart illustrating operation of a network file system client mounting an export in accordance with an illustrative embodiment.

DETAILED DESCRIPTION

Figure 1:
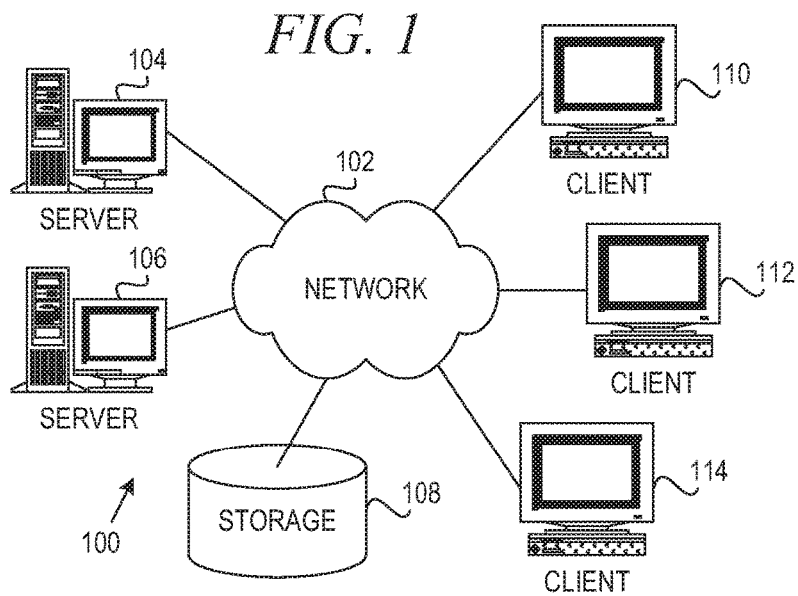
FIG. 1 is an example diagram of a distributed data processing system in which aspects of the illustrative embodiments may be implemented.

Network File System (NFS) is a widely used file access protocol in the Network Attached Storage (NAS) world. NFS is a distributed file system protocol that has been in existence for almost thirty years. NFS is used with Unix®-like operating systems, Unix operating systems, and other operating systems. UNIX is a registered trademark in the United States and other countries, licensed exclusively through X/Open Company Ltd. Other network protocol based or distributed file systems exist. While the illustrative embodiments described herein apply to the NFS file access protocol, aspects of the illustrative embodiments apply to other network protocol based or distributed file systems. Thus, as used herein, the terms "network file system" or "distributed file system" may refer to any applicable network protocol based or distributed file system.

The NFS client sends every NFS request to the NFS server for processing. For every modification to the file or directory, the NFS client checks the attributes of that object with the NFS server and decides whether the client should send the modification request to the server or not. This behavior becomes problematic when it comes to work with read-only mounts or exports. The NFS client does not act smartly in such cases and keeps checking the attributes of the object to be modified with the NFS server. This problem can be well explained by two scenarios.

Scenario 1: The NFS client mounts an NFS export with access type as read-only. Currently, the NFS client relies on the NFS server to take note of the access type of mount. Thus, whenever there is a file operation that requires modification of a read-only mounted file system, the NFS client first checks whether the object (file/directory) is modifiable by sending a request to the NFS server. The NFS server then sends a response to the NFS client based on which EROFS error is thrown to the end user.

Scenario 2: The NFS client mounts a read-only NFS export with access type as read-write. In this scenario, again, the NFS client sends the modification request to the NFS server. As the export is read-only, the NFS server errors out, indicating that it is a read-only file system. The scenario changes only when the NFS server changes its export from read-only to read-write.

In both of the above scenarios, there are three major issues observed for read-only mounts:

Overhead involved in sending attribute check requests from the NFS client to the NFS server results in wasted network bandwidth.

The NFS server has to work on the request and inform back with the attributes, which results in a waste of NFS server resources.

The NFS client has to wait for the NFS server to respond to the attribute check request, which results in performance degradation due to the wait cycle.

Currently, the NFS client does not interpret the type of mount or what kind of error message it receives from the NFS server. When the client mounts the NFS export as read-only, then there is definitely no need to reach the server for any attribute check for a modification operation, such as changing file contents, changing access control lists (ACLs), permissions, ownership, or deleting the file/directory. These kinds of operations are certainly going to fail. The NFS client can intelligently throw the same error without reaching the NFS server and, thus, reduce network bandwidth usage, avoid unnecessary server resource utilization, and increase performance because no wait cycle is involved.

Changing NFS exports from read-only to read-write, or vice versa, is not an on-going activity. Changing the access type of an NFS export happens once in a while with administrator involvement. Therefore, if the NFS client mounted an NFS export as read-write (at server side exported as read-only), then the NFS client can cache the "Read Only File System" (EROFS) error it got for file modification operation and can avoid further sending of such modification requests to the server for a small interval (e.g., 10-15 minutes). This interval may be configurable. This may result in increased performance, reduced network bandwidth, and less server resource utilization for that interval.

The illustrative embodiments modifies operation of the file system client to perform the following for each mounted file system export:

Record the access type of the mount being done on its site.

Check the "EROFS" error it receives from the file system server and keep track of it.

Intelligently avoid sending (all or some of) the modification requests to the NFS server.

The illustrative embodiments modify the file system client as follows. After a file system client successfully mounts a file system export, in addition to its usual operations, it will save the access type (read-only/read-write) of the mounted file system export and set an EROFS_flag to "false."

While working on each request for a mounted file system export, if a request is not a modification request, the file system client will forward the request to the server. Otherwise, if the export has been mounted as read-only, then the client returns EROFS error (appropriate for the file system version). If the export has been mounted as read-write and if the EROFS-flag is true for that export (it has maintained the time stamp of the last EROFS error), then if the time interval for which the file system client should not reach the file system server is not over, then the client returns the EROFS error (appropriate for the file system version). Otherwise, the client forwards the request to the file system server. If the EROFS_flag is false, then the file system client forwards the request to the file system server. The file system client monitors the response from the file system server. If the results of the operation is an error EROFS, then the file system client sets the EROFS_flag as true and notes the current time. Otherwise, the file system client sets the EROFS_flag as false. The rest of the file system client operation remains the same.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
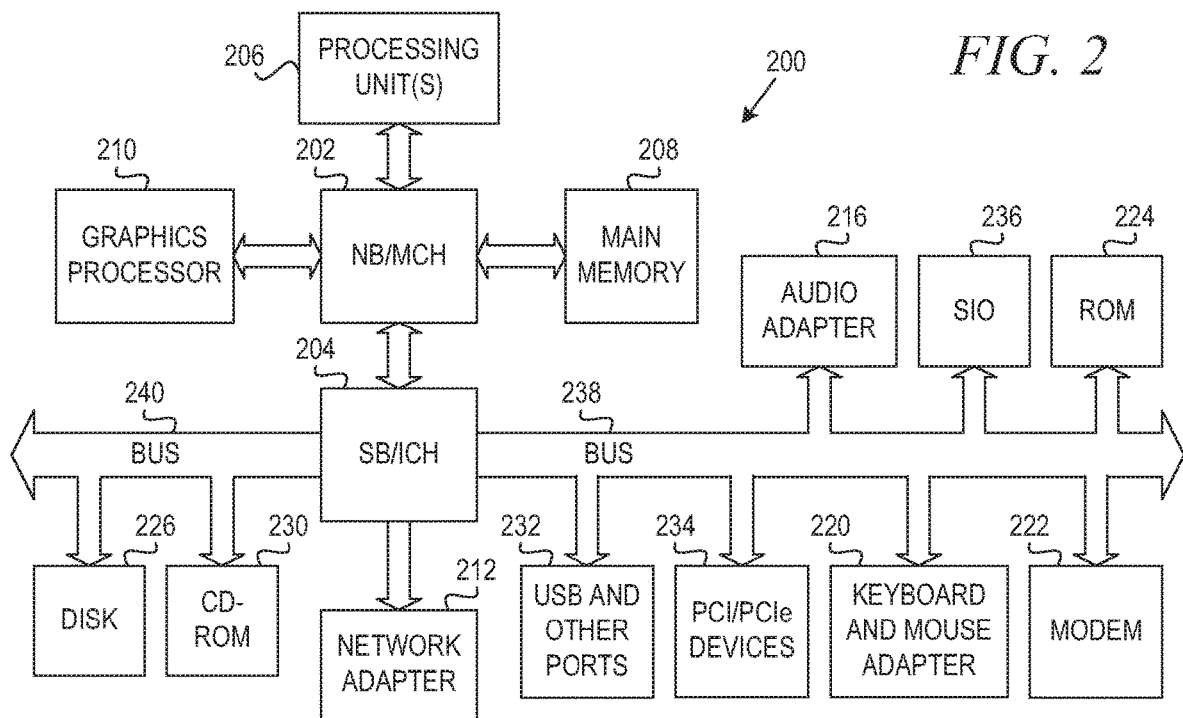
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., client 110-114, may be specifically configured to optimize file system client operation for read-only exports/mounts to reduce network utilization and improve performance. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates optimized file system client operation for read-only exports/mounts.

As noted above, the mechanisms of the illustrative embodiments utilize specifically configured computing devices, or data processing systems, to perform the operations for improved performance for file system clients. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the optimized file system client for read-only exports/mounts.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram of a network file system configuration in accordance with an illustrative embodiment. Network protocol based file system client 310 mounts file system export 325 from file system server 320. File system client 310 mounts the export as file system export/mount 315. File system server 320 may export file system export 325 as read-write to allow modification to file system export 325 or as read-only to indicate that modification is not allowed. File system client 310 may mount file system export/mount 315 as read-write to allow modifications at file system client 310 or as read-only to indicate that modification is not allowed at file system client 310. Thus, file system server 320 may export file system export 325 as read-write, and file system client 310 may mount file system export/mount 315 as read-only. On the other hand, file system server 320 may export file system export 325 as read-only, and file system client 310 may mount file system export/mount 315 as read-write, which would result in every modification request being allowed at file system client 310 and rejected at file system server 320.

Currently, file system client 310 relies on file system server 320 to take note of the access type of the mount 315. If file system client 310 mounts the file system export 315 with access type read-only and the file system client 310 encounters a modification request, then file system client 310 needlessly sends requests to file system server 320 to check whether the object (file/directory) is modifiable at file system server 320. The file system server 320 sends a response to the file system client based on which EROFS error is thrown to the end user.

If file system client 310 mounts a read-only file system export/mount 315 with access type read-write, then the file system client automatically sends the modification request to the server. As the export 325 is read-only, the file system server 320 errors out, indicating that it is a read-only file system.

Both of the above scenarios result in overhead involved in needlessly sending attribute check requests from the file system client 310 to the file system server, resource utilization at the file system server 320, and wait cycles at file system client 310.

FIG. 4 is a block diagram of an optimized network file system configuration for read-only exports/mounts in accordance with an illustrative embodiment, file system client 410 mounts file system export 425 from file system server 420 as file system export/mount 415. After file system client 410 successfully mounts the file system export/mount 415, in addition to its usual operations, file system client 410 saves the access type 416 (read-only/read-write) of the mounted file system export 415. Access type 416 indicates whether the file system export/mount 415 was mounted as read-only or read-write. File system client 410 also sets an EROFS_flag equal to "false."

While working on each file system request for mounted file system export 415, file system client 410 determines whether each file system request is a modification request. If the file system request is not a modification request, then file system client 410 forwards the attribute check request to file system server 420.

Otherwise, for each modification request, file system client 410 checks access type 416. If the export has been mounted as read-only, then file system client 410 returns an EROFS error. If the export has been mounted as read-write and if the EROFS_flag is set to "true" for that export 415, then file system client 410 determines whether the time interval for which the file system client 410 should not send attribute checks to the file system server 420 has expired. File system client 410 records the time stamp of the last EROFS error received from the file system server. File system client 410 then subtracts that time from the current time and compares the result to a threshold. The threshold may be configurable. If the comparison indicates that the time interval has not expired, then file system client 410 returns the EROFS error. If the time interval has expired, then file system client 410 forwards the request to file system server 420.

An administrator at file system server 420 may change file system export 425 from read-only to read-write or vice versa. It is unlikely that this would occur with high frequency; therefore, a given period of time is likely to pass before the access type of file system export 425 will change. Thus, file system client 410 allows a predetermined time period to expire before checking the access type of file system export 425. File system client 410 does this using the above EROFS time stamp and the configurable threshold. If file system client 410 receives an EROFS error from file system server 420 for file system export 425, then it the access type of file system export 425 is unlikely to change for the time period represented by the threshold (e.g., 10 minutes). That is, file system client 410 can expect to receive an EROFS error from file system server 420 for the time period defined by time stamp and threshold. A user or administrator may adjust this time period by changing the threshold.

If the EROFS_flag is set to "false," then file system client 410 forwards the attribute check request to the file system server. File system client 410 then monitors the response from the file system server 420. If the result of the operation is an EROFS error, then file system client 410 sets the EROFS_flag to "true" and records the current time as the time stamp of the last EROFS error. Otherwise, file system client 410 sets the EROFS_flag to "false." The rest of the file system client 410 operation is unmodified.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 5 is a flowchart illustrating operation of a network file system client mounting an export in accordance with an illustrative embodiment. Operation begins (block 500), and the file system client receives a mount request to mount a file system export at a server (block 501). The file system client processes the mount request as usual (block 502). For that mount path, the file system client stores the access type (read-only/read-write) of the file system export (block 503). Thereafter, operation ends (block 504).

Figure 6:
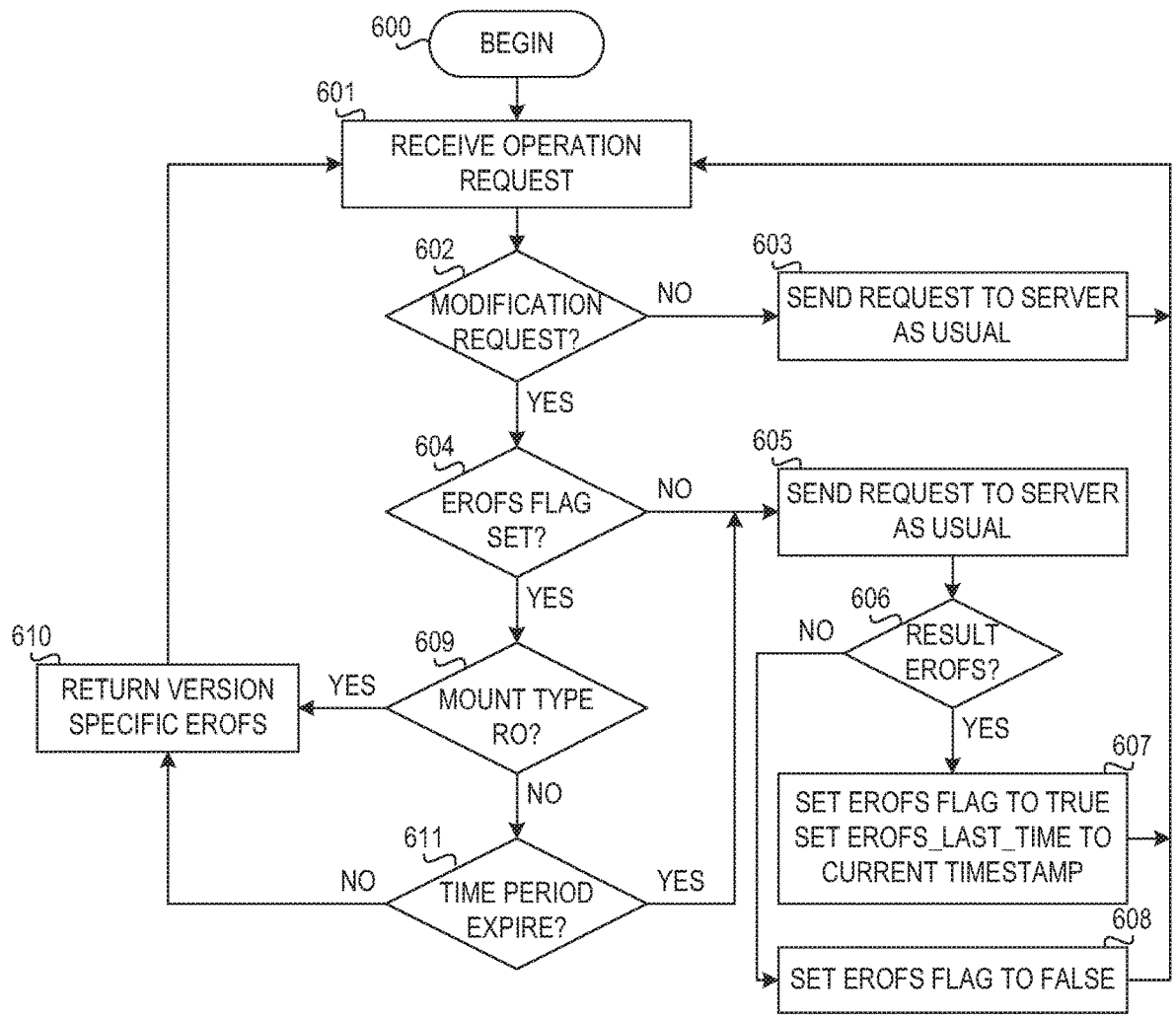
FIG. 6 is a flowchart illustrating operation of a network file system client working on file system requests for a mounted export in accordance with an illustrative embodiment.

FIG. 6 is a flowchart illustrating operation of a network file system client working on file system requests for a mounted export in accordance with an illustrative embodiment. Operation begins (block 600), and the file system client receives a file system operation request from a user (block 601). The file system client determines whether the file system operation request is a modification request (block 602). A modification request may be, for example, a request to change file contents, rename a file or directory, change access control lists (ACLs), change permissions, change ownership, or delete a file or directory. If the file system operation request is not a modification request, the file system client sends the request to the file system server as usual (block 603). Thereafter, operation returns to block 601 to receive the next file system operation request.

If the file system operation request is a modification request in block 602, the file system client determines whether the EROFS flag is set (i.e., EROFS_flag=true) (block 604). If the flag is not set, then the file system client sends the request to the file system server as usual (block 605). The file system client determines whether the result is a read-only file system (EROFS) error (block 606). If the result of the request is EROFS, then the file system client sets the EROFS flag (i.e., EROFS_flag=true) and sets a timestamp of the last EROFS error (EROFS_LAST_TIME) to the current time (block 607). Thereafter, operation returns to block 601 to receive the next file system operation request. If the result of the request is not EROFS in block 606, then the file system client sets the EROFS flag to false (i.e., EROFS_flag=false) (block 608). Thereafter, operation returns to block 601 to receive the next file system operation request.

If the EROFS flag is set (i.e., EROFS_flag=true) in block 604, then the file system client determines whether the mount type is read-only (block 609). If the mount type is read-only, then the file system client returns a version specific EROFS error to the user (block 610), and operation returns to block 601 to receive the next file system operation request.

If the mount type is not read-only (i.e., the mount type is read-write) in block 609, then the file system client determines whether the time interval for which the file system client should not send modification requests to the file system server has expired (block 611). The file system client subtracts the time stamp of the last EROFS error (recorded in EROFS_LAST_TIME) from the current time and compares the result to a threshold. The threshold may be configurable. If the time period has not expired, then the file system client returns a version specific EROFS error to the user (block 610), and operation returns to block 601 to receive the next file system operation request. If the time period has expired in block 611, then operation proceeds to block 605 to send the request to the server as usual.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory comprising instructions which, when executed by the at least one processor, causes the at least one processor to implement a network protocol file system client for read-only exports, the method comprising:
   receiving, by the file system client, a mount request to mount an export at a file system server;
   storing, by the file system client, an access type of the mounted export;
   responsive to the file system client receiving from a user a modification request to perform a modification on an object in the mounted export, sending an attribute check request to the file system server;
   responsive to the file system client receiving a first read-only file system error from the file system server, setting a read-only file system error flag;
   responsive to the file system client receiving a subsequent modification request to perform a modification on an object in the mounted export, determining whether the read-only file system error flag is set; and
   responsive to the file system client determining that the read-only file system error flag is set and the access type of the export is read-only, returning a second read-only file system error to the user.

2. The method of claim 1, further comprising:
   responsive to the file system client receiving the read-only file system error from the file system server, recording a time stamp of the read-only file system error.

3. The method of claim 2, further comprising:
   responsive to the file system client receiving the subsequent modification request and determining that the access type of the export is not read-only, determining whether a predetermined time period has expired since a last read-only file system error based on the recorded time stamp; and
   responsive to the file system client determining that the predetermined time period has not expired, returning the second read-only file system error to the user.

4. The method of claim 3, further comprising:
   responsive to the file system client determining that the predetermined time period has expired, sending a subsequent attribute check for the subsequent modification request to the file system server; and
   responsive to the subsequent attribute check resulting in a subsequent read-only file system error, setting the read-only file system error flag and recording the timestamp of the subsequent read-only file system error.

5. The method of claim 4, further comprising:
   responsive to the subsequent attribute check not resulting in a read-only file system error, setting the read-only file system error flag to false.

6. The method of claim 1, further comprising:
   responsive to the file system client determining that the read-only file system error flag is not set, sending a subsequent attribute check for the subsequent modification request to the file system server; and
   responsive to the subsequent attribute check resulting in a subsequent read-only file system error, setting the read-only file system error flag and recording the timestamp of the subsequent read-only file system error.

7. The method of claim 6, further comprising:
   responsive to the subsequent attribute check not resulting in a read-only file system error, setting the read-only file system error flag to false.

8. The method of claim 1, further comprising:
   responsive to the attribute check not resulting in a read-only file system error, setting the read-only file system error flag to false.

9. A computer program product comprising a computer readable storage medium having a computer readable program stored therein, wherein the computer readable program, when executed on a computing device, causes the computing device to implement a network protocol based file system client for read-only exports, wherein the computer readable program causes the computing device to:
   receive, by the file system client, a mount request to mount an export at a file system server;
   store, by the file system client, an access type of the mounted export;
   responsive to the file system client receiving from a user a modification request to perform a modification on an object in the mounted export, send an attribute check request to the file system server;

responsive to the file system client receiving a first read-only file system error from the file system server, set a read-only file system error flag;

responsive to the file system client receiving a subsequent modification request to perform a modification on an object in the mounted export, determine whether the read-only file system error flag is set; and responsive to the file system client determining that the read-only file system error flag is set and the access type of the export is read-only, return a second read-only file system error to the user.

10. The computer program product of claim 9, wherein the computer readable program further causes the computing device to:

responsive to the file system client receiving the read-only file system error from the file system server, record a time stamp of the read-only file system error.

11. The computer program product of claim 10, wherein the computer readable program further causes the computing device to:

responsive to the file system client receiving the subsequent modification request and determining that the access type of the export is not read-only, determine whether a predetermined time period has expired since a last read-only file system error based on the recorded time stamp; and responsive to the file system client determining that the predetermined time period has not expired, return the second read-only file system error to the user.

12. The computer program product of claim 11, wherein the computer readable program further causes the computing device to:

responsive to the file system client determining that the predetermined time period has expired, send a subsequent attribute check for the subsequent modification request to the file system server; and responsive to the subsequent attribute check resulting in a subsequent read-only file system error, set the read-only file system error flag and record the timestamp of the subsequent read-only file system error.

13. The computer program product of claim 12, wherein the computer readable program further causes the computing device to:

responsive to the subsequent attribute check not resulting in a read-only file system error, set the read-only file system error flag to false.

14. The computer program product of claim 9, wherein the computer readable program further causes the computing device to:

responsive to the file system client determining that the read-only file system error flag is not set, send a subsequent attribute check for the subsequent modification request to the file system server; and responsive to the subsequent attribute check resulting in a subsequent read-only file system error, set the read-only file system error flag and record the timestamp of the subsequent read-only file system error.

15. The computer program product of claim 14, wherein the computer readable program further causes the computing device to:

responsive to the subsequent attribute check not resulting in a read-only file system error, set the read-only file system error flag to false.

16. The computer program product of claim 9, wherein the computer readable program further causes the computing device to:

responsive to the attribute check not resulting in a read-only file system error, set the read-only file system error flag to false.

17. An apparatus comprising:

at least one processor; and a memory coupled to the at least one processor, wherein the memory comprises instructions which, when executed by the at least one processor, cause the at least one processor to implement a network protocol based file system client for read-only exports, wherein the instructions cause the at least one processor to:

receive, by the file system client, a mount request to mount an export at a file system server;

store, by the file system client, an access type of the mounted export;

responsive to the file system client receiving from a user a modification request to perform a modification on an object in the mounted export, send an attribute check request to the file system server;

responsive to the file system client receiving a first read-only file system error from the file system server, set a read-only file system error flag;

responsive to the file system client receiving a subsequent modification request to perform a modification on an object in the mounted export, determine whether the read-only file system error flag is set; and responsive to the file system client determining that the read-only file system error flag is set and the access type of the export is read-only, return a second read-only file system error to the user.

18. The apparatus of claim 17, wherein the instructions further cause the at least one processor to:

responsive to the file system client receiving the read-only file system error from the file system server, record a time stamp of the read-only file system error.

19. The apparatus of claim 18, wherein the instructions further cause the at least one processor to:

responsive to the file system client receiving the subsequent modification request and determining that the access type of the export is not read-only, determine whether a predetermined time period has expired since a last read-only file system error based on the recorded time stamp; and responsive to the file system client determining that the predetermined time period has not expired, return the second read-only file system error to the user.

20. The apparatus of claim 19, wherein the instructions further cause the at least one processor to:

responsive to the file system client determining that the predetermined time period has expired, send a subsequent attribute check for the subsequent modification request to the file system server; and responsive to the subsequent attribute check resulting in a subsequent read-only file system error, set the read-only file system error flag and record the timestamp of the subsequent read-only file system error.

21. The apparatus of claim 20, wherein the instructions further cause the at least one processor to:

responsive to the file system client determining that the read-only file system error flag is not set, send a subsequent attribute check for the subsequent modification request to the file system server; and responsive to the subsequent attribute check resulting in a subsequent read-only file system error, set the read-only file system error flag and record the timestamp of the subsequent read-only file system error.

* * * * *